United States Patent
Monson et al.

(10) Patent No.: US 6,695,524 B2
(45) Date of Patent: Feb. 24, 2004

(54) MOUNT LOCKING PLATE

(76) Inventors: Robert James Monson, 1027 Brenner Ave., St. Paul, MN (US) 55113; Wesley Eugene Revely, 14314 Estates Ave., Apple Valley, MN (US) 55124

(*) Notice: Subject to any disclaimer, the term of this patent is extended or adjusted under 35 U.S.C. 154(b) by 0 days.

(21) Appl. No.: 09/992,325

(22) Filed: Nov. 19, 2001

(65) Prior Publication Data

US 2003/0095831 A1 May 22, 2003

(51) Int. Cl.⁷ .......................... F16M 13/00; F16B 2/14
(52) U.S. Cl. .................. 403/374.3; 403/374.4; 403/370; 403/409.1; 248/231.31; 248/231.41; 52/167.7
(58) Field of Search ................. 403/374.3, 374.4, 403/370, 409.1; 248/231.31, 231.41, 656, 657; 52/167.7, 167.8

(56) References Cited

U.S. PATENT DOCUMENTS

| | | | | |
|---|---|---|---|---|
| 3,243,153 A | * | 3/1966 | Kelly et al. | 248/231.21 |
| 3,390,862 A | * | 7/1968 | Schrepfer | 254/104 |
| 4,480,287 A | * | 10/1984 | Jensen | 439/327 |
| H000906 H | * | 4/1991 | Baggett et al. | 403/409.1 |
| 5,078,359 A | * | 1/1992 | Stanage et al. | 248/231.31 |
| 5,263,351 A | * | 11/1993 | Berg, III | 403/374.3 |

* cited by examiner

*Primary Examiner*—Lynne H. Browne
*Assistant Examiner*—Ernesto Garcia

(57) ABSTRACT

A mount locking plate with the mount locking plate including plate members for fixedly securing to a support surface and a pair of longitudinally displaceable complementary members that can be laterally positioned proximate the plate members. The complementary members can be longitudinally displaced with respect to one another to bring the displaceable complementary members into interlocked and aligned engagement with the plate members. A fastener allows the positioning of the displaceable complementary members into interlocked and aligned engagement from a position laterally removed from the mount locking plate.

9 Claims, 3 Drawing Sheets

MOUNT LOCKING PLATE

FIELD OF THE INVENTION

This invention relates generally mount plates and, more specifically, to mount plates that allow one to quickly attach or detach a shock and vibration mount.

CROSS REFERENCE TO RELATED APPLICATIONS

None

STATEMENT REGARDING FEDERALLY SPONSORED RESEARCH OR DEVELOPMENT

None

REFERENCE TO A MICROFICHE APPENDIX

None

BACKGROUND OF THE INVENTION

Shock and vibration mounts are used to isolate equipment from shock and vibration. Generally, one end of a shock mount is secured to a rigid support surface such as a wall and the other end is secured to an object such as a cabinet containing equipment that needs to be isolated from shock and vibration. From time to time the equipment may need to be serviced, which can require removing the equipment to a remote location. To remove the equipment it is oftentimes times necessary to detach the shock and vibration mounts. When the equipment servicing is completed it is necessary to reattach the shock and vibration mounts. As shock and vibration mounts are generally located in low clearance regions between a support structure and a cabinet there is generally little space for an operator to engage or disengage the elastomer mounts. As a result blind fasteners are often used to secure the shock and vibration mounts. As the blind fasteners are not visible from the front or rear of the shock mount or cabinet they normally can be accessed by a worker placing a special tool between the support structure and the cabinet. Obviously, this is an undesirable condition since the worker is working blind. In addition, if the worker is not familiar with the mount hardware it is difficult for the worker to determine how to detach the shock and vibration mount as well as the type of tool to use. A further difficulty is that when the shock and vibration mounts are reattached one cannot always easily align the shock and vibration mounts if blind fasteners are used. The present invention provides the ability to install mounts in a blind position without fear of misalignment of the mount or to detach and reattach a mount with assurance that the mount will be in proper alignment.

The present invention provides a mount locking plate which is secured to an end of a shock and vibration mount. The mount locking plate has stationary members and complementary moveable members. The stationary members are secured to a support structure with the complementary movable members securable to an end of a shock and vibration mount. Securing the mount to the complementary movable members allows an operator positioned in a frontal position to the mount locking plate to attach or detach the shock and vibration mounts from the mount locking plate by engaging or disengaging the stationary and complementary moveable members. In addition, the mount locking plate includes guide alignment surfaces so that if when one removes and replaces the shock and vibration mount one can quickly place the shock and vibration mount in the proper location.

SUMMARY OF THE INVENTION

A mount locking plate with the mount locking plate including plate members for fixedly securing to a support surface and a pair of longitudinally displaceable complementary members that can be laterally positioned proximate the plate members. The complementary members can be longitudinally displaced with respect to one another to bring the displaceable complementary members into interlocked and aligned engagement with the plate members. A fastener allows the positioning of the displaceable complementary members into interlocked and aligned engagement from a position laterally removed from the mount locking plate.

DESCRIPTION OF THE PREFERRED EMBODIMENT

Figure 1:
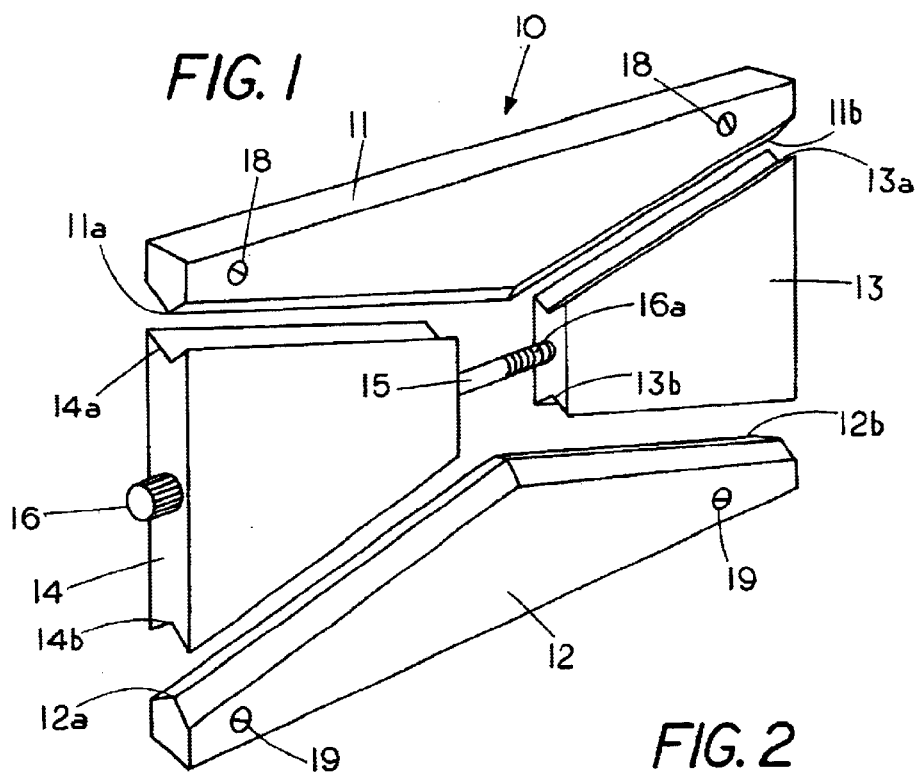
FIG. 1 is a perspective view of a mount locking plate in an open condition for lateral removable of base members for carrying a shock and vibration mount.

FIG. 1 shows a mount locking plate 10 in an open condition. Mount locking plate 10 includes a first triangular shaped plate member 11 that is fixedly securable to a support surface by fasteners 18 and a second triangular shaped plate member 12 that is also fixedly securable to a support surface by fasteners 19. A first axially positionable trapezoidal shaped plate or base member 14 and a second axially positionable trapezoidal shaped plate or base member 13, which are longitudinally displaceable with respect to each other, are located internal to secured plate member 11 and plate member 12. A rotateable shoulder fastener 15 having a head 16 and a lower end with male threads 16a that engage a threaded recess in member 13 connects plate member 12 to plate member 13. The portion of the rotateable fastener 15 extending through member 14 is allowed to rotate freely therein but the portion of the rotateable fastener engaging plate member 13 engages a female thread therein so that rotation in one direction draws members 12 and 13 toward each other and rotation in the opposite direction forces members 12 and 13 away from each other.

The mount locking plate 10 is shown to include plate members 11 and 12 for fixedly securing to a support surface and a pair of longitudinally displaceable complementary members 13 and 14 that can be laterally positioned proximate the fixedly secured plate members 11 and 12. The complementary members 13 and 14 can be longitudinally or axially displaced with respect to one another to bring the displaceable complementary members 13 and 14 into interlocked and aligned engagement with secured plate members 11 and 12. A fastener head 16 allows the positioning of the displaceable complementary members into interlocked and aligned engagement from a frontal position remote from the mount locking plate 10.

Located along a first internal edge of plate member 12 is a retaining member 12a comprising a v-shaped protuberance or retaining lip for interlocking engagement with a mating retaining member 14b on member 14 with retaining member 14b comprising a mating v-shaped groove. Similarly, located along a second internal edge of plate member 12 is a retaining member 12b comprising a v-shaped protuberance or retaining lip for interlocking engagement with a mating retaining member 13b on member 13 with retaining member 13b comprising a mating v-shaped groove 13b.

Located along a first internal edge of plate member 11 is a retaining member 11a comprising a v-shaped protuberance for interlocking engagement with a mating retaining member 14a on member 14 with retaining member 14a comprising a mating v-shaped groove. A second internal edge of plate member 11b has a retaining member which is identical to retaining member 11a for interlocking engagement with a mating retaining member 13a with retaining member 13a comprising a mating v-shaped groove.

In operation of the mount locking plate 10 the two members 11 and 12 are fixedly secured to a support surface by fasteners 18 and 19 that extend perpendicularly through a face of members 18 and 19. The two longitudinally or axially displaceable members 13 and 14 are spaceable from each other by rotateable fastener 15. Once properly spaced from each other the two members 13 and 14 can be laterally inserted between the two fixed members 11 and 12. Once movable members 13 and 14 are positioned internally with respect to members 11 and 12 the fastener head 16 is rotated to bring members 13 and 14 toward each other. The complementary relationship of the members causes the members 13 and 14 to come into wedging contact with fixed members 11 and 12. As a result the retaining members on the edges of member 13 and 14 engage the retaining members on the edges of members 11 and 12. That is, the v-shaped protuberances engage the v-shaped grooves to prevent both lateral or longitudinal displacement of members 13 and 14 with respect to members 11 and 12. Thus it will be appreciated that by rotation of a single fastener 15 from a frontal position with respect to the mount locking plate one can lock plate members 13 and 14 to plate members 11 and 12.

Figure 2:
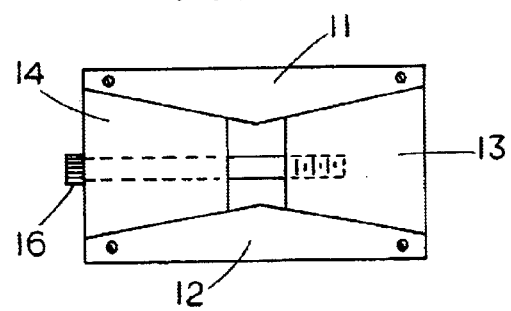
FIG. 2 is a front view showing the mount locking plated in a second condition where the base members are fixedly carried by a pair of plate members.

FIG. 2 illustrates the condition where members 13 and 14 are in locked engagement with members 11 and 12, which are fixedly secured to a support surface. Thus, the members 13 and 14 can be quickly secured in a fixed position by merely rotating fastener 15. Similarly, members 13 and 14 can be quickly released by rotating fastener 15 in an opposite direction to longitudinally displace member 13 and 14 from each other.

Figure 3:
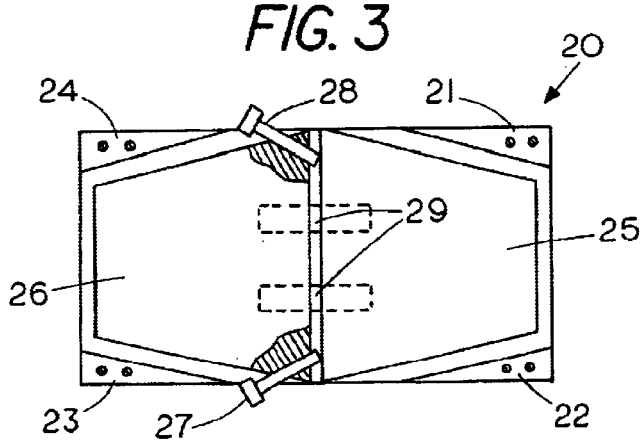
FIG. 3 is an alternate embodiment of a mount locking plate where separation of the base members brings the base members into locking engagement.

FIG. 3 shows an alternate embodiment of a mount locking plate 20 comprised of four triangular shaped corner members 21, 22, 23 and 24 which are fixedly secured to a support surface. Located internally to the corner members is a first trapezoidal shaped plate 25 and a second trapezoidal shaped plate 26. A set of dowels 29 maintain the plates in longitudinal alignment and permits aligned longitudinal displacement of the plates with respect to one another. In the embodiment of FIG. 3 the plate members 25 and 26 are forced apart from each other by use of screw members 28 and 29. That is, female threads in member 26 allow for member 27 and 28 to force member 25 away from member 26 and thus bring the edges of members 25 and 26 into engagement with the corner members 21, 22, 23 and 24. Similarly to the mount locking plate 10 mount locking plate 20 also includes retaining members (not shown) so that the plates 25 and 26 can be locked and retained by corner members 21, 22, 23 and 24 by rotation of screws 27 and 28.

Figure 4:
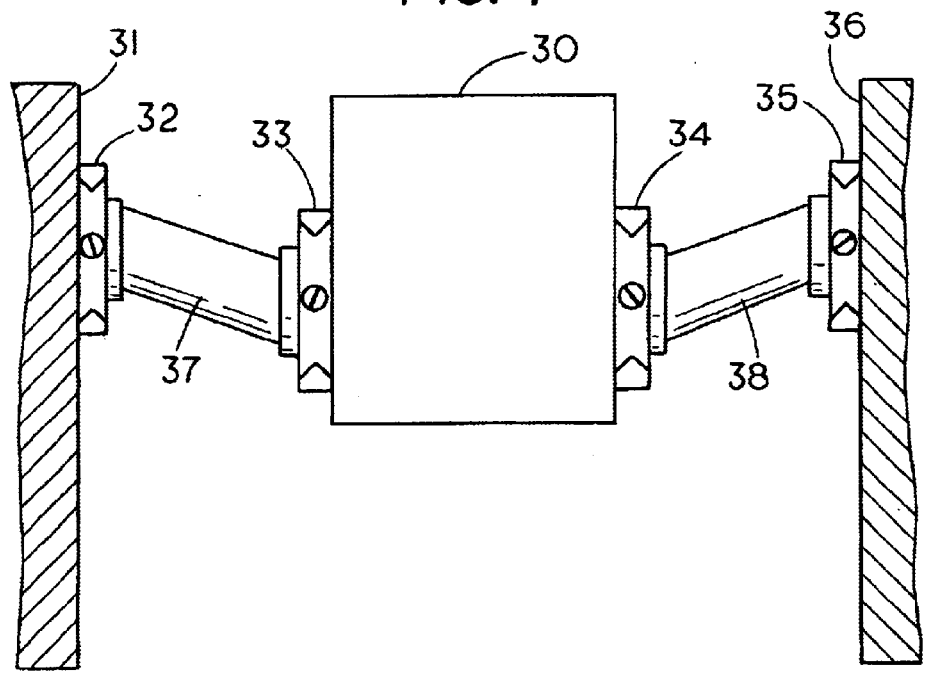
FIG. 4 is a front view showing a cabinet cantileverly supported by a set of mounting plates each carrying a set of shock and vibration mounts.

In order to illustrate the operation of mount locking plates with a cabinet cantileverly supported from a fixed support surface by a set of shock and vibration mounts reference should be made to FIG. 4 which shows a front view of a set of supporting surfaces 31 and 36. Attached to support surface 31 is a first mount locking plate 32 and attached to support surface 36 is a second mount locking plate 35. While two set of shock and vibration mounts are shown it should be understood that the present invention is usable with a single shock and vibration mount.

Positioned between support surfaces 31 and 36 is a cabinet 30 that contains equipment that is to be isolated from shock and vibration forces. Located on one side of cabinet 30 is a third mount locking plate 33 and located on the opposite side is a fourth mount locking plate 34. A first elastomer mount 37 has a first end secured to mount locking plate 32 and a second end secured to mount locking plate 33. Similarly, a second elastomer mount 38 has a first end secured to mount locking plate 34 and a second end secured to mount locking plate 35 to thereby cantileverly support cabinet 30 in condition that isolates shock and vibration to the support surfaces 31 and 36 from the cabinet 30.

Figure 5:
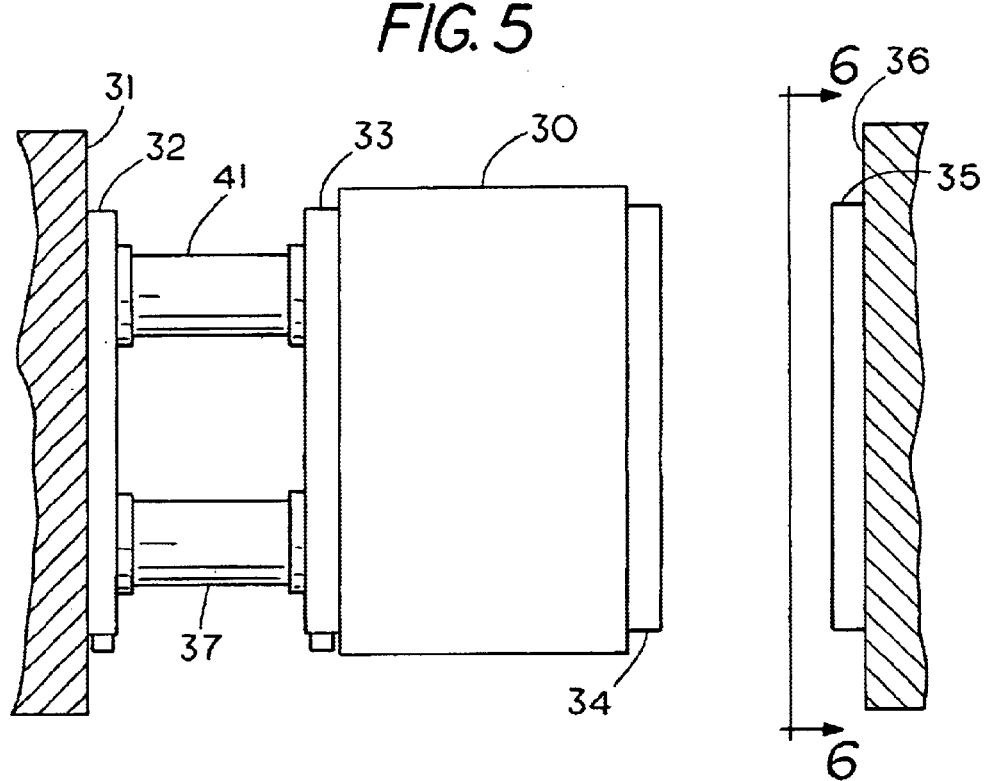
FIG. 5 is a top view of the system of FIG. 5 with one set of shock and vibration mounts removed.

FIG. 5 is a top view of the cabinet 30 and the mount locking plates shown in FIG. 4 except one set of shock and vibration mounts have been removed. FIG. 5 also reveals a second elastomer shock mount 41 which is located behind shock mount 37. While a pair of elastomer shock mounts are shown on each mount locking plates the present invention is usable with only a single elastomer shock mount or the like secured thereto.

Figure 6:
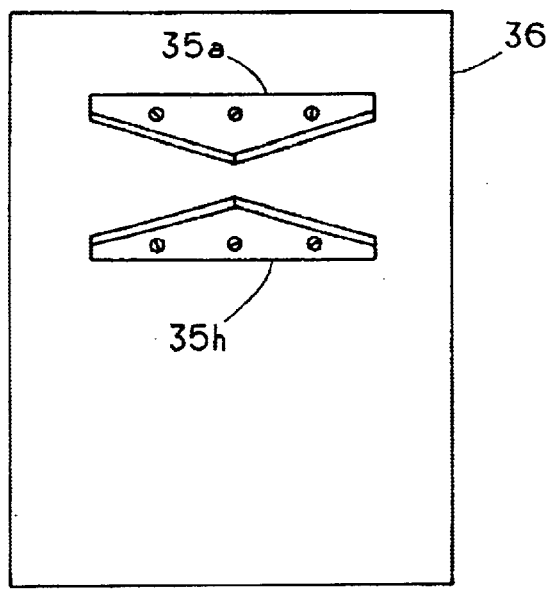
FIG. 6 is a view taken along lines 6—6 of FIG. 5 to show the plate members of the mount locking plate fixedly secured to a supporting structure.

FIG. 6 is a front view taken along lines 6—6 showing the plate members 35g and 35h secured to support surface 36 by fasteners that extend perpendicularly into support surface 36. The plate members 35g and 35h once installed can remain in place even during removal of the cabinet 30 since the plate members generally have a low profile.

Figure 7:
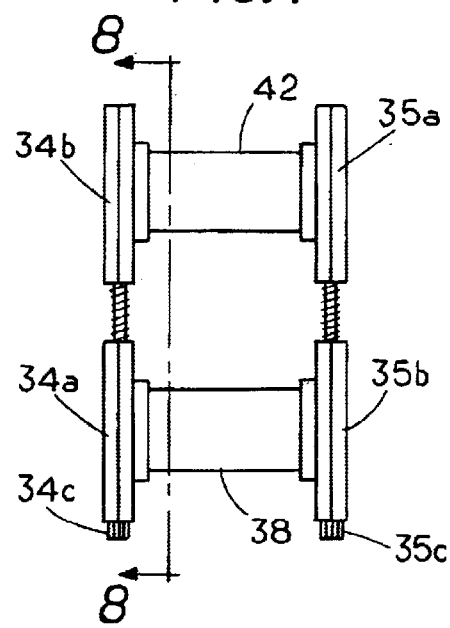
FIG. 7 is a top view of a pair of shock and vibration mounts secured to base members with the shock and vibration mounts being in an unattached condition.

FIG. 7 shows a top view of the two shock and vibration mounts 38 and 42 which have been removed from support of cabinet 30. Mount 38 has a first end adhesively secured to plate 34b and a second end adhesively secured to plate 35a. Similarly, mount 38 has a first end adhesively secured to plate 34a and a second end adhesively secured to plate 35b. The plates 34a and 34b are held together as a unit by the rotatable fastener member 34c and the plates 35a and 35b are held together by rotateable fastener member 35c.

Figure 8:
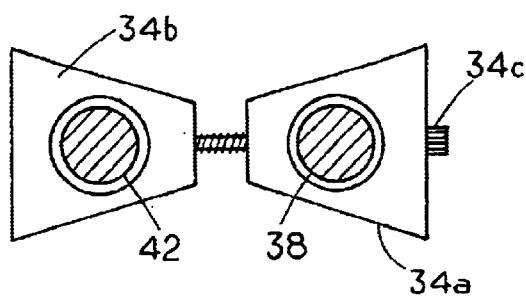
FIG. 8 s a cross sectional view taken along lines 8—8 of FIG. 7.

FIG. 8 is a cross sectional view taken along lines 8—8 of FIG. 7 revealing the position of the shock and vibration mounts 42 on plate member 34g and the position of shock and vibration mount 38 on plate 34c.

As shown in FIG. 7 the two shock and vibration mounts 38 and 42 can be removed as a unit by releasing their plate members from their respective fixed mount locking plates. In order to appreciate the removal of shock and vibration mount 38 and 42 reference should be made to FIGS. 5–7. To remove the shock and vibration mounts 38 and 42 the operator can reach in from the front of cabinet 30 to unscrew fastener 34c which causes plate members 34a and 34b to separate. That is, unscrewing fastener 34*c* causes plate member 34*a* and 34*b* to be longitudinally displaced and in a position to be laterally removed from the mount locking plates 34. The operator does not need to obtain access to the screw fasteners that extend perpendicular to support surface 36 or cabinet 30. Similarly, unscrewing fastener 35*c* causes plate member 35*a* and 35*b* to be longitudinally displaced and in a position to be laterally removed from the mount locking plates 35. A feature of the removal method is that because the shock and vibration mounts are flexible in order to absorb shock and vibration one can use the flexibility of the shock and vibration mounts 38 and 42 to laterally displace plates 34*a* and 34*b* away from mount locking plate 34 thereby freeing plates 34*a* and 34*b* from retained engagement. Similarly, once plates 34*a* and 34*b* are free one can use the flexibility of shock and vibration mount 38 and 42 to laterally displace plates 35*a* and 35*b* from the mount locking plate 35 thus freeing both ends of the plates supporting the shock and vibration mounts. This allows for quick removal of the shock and vibration mounts. Because the mechanisms for longitudinally displacing the plates projects forward one can visually observe the presence of the rotateable fastener 34*c* and 35*c* from the front of the cabinet as well as manipulate the fasteners. Consequently, one can provide for front release of shock and vibration mounts that are secured by mount locking plates that have fasteners means that are perpendicular secured to the support surface or the support has been obscured.

We claim:

1. A mount locking plate comprising:

a first member having a retaining lip;

a second member having a retaining lip, said first member and said second member secured to a surface in a spaced apart fixed condition;

a third member for carrying a shock and vibration mount, said third member having an end of a first end of an elastomer mount secured to the third member;

a fourth member, said fourth member laterally positionable with respect to said third member so that when said third member and said fourth member are in a first condition the third member and fourth member are secured to the first member and the second member by the retaining lip on the first member and the retaining lip on the second member and when said third member and said fourth member are in a second condition the third member and the fourth member are in disengagement with the first member and the second member allowing one to laterally remove the third member and the fourth member from the first member and the second member.

2. The mount locking plate of claim 1 including a threaded fastener carried by said third member and said fourth member for bringing said third member and said fourth member into the first condition.

3. The mount locking plate of claim 1 wherein the third member and the fourth member have a trapezoidal shape.

4. The mount locking plate of claim 1 including a retaining member on the third member comprising a v-shaped groove.

5. The mount locking plate of claim 4 including a retaining member on the fourth member comprising a v-shaped groove.

6. The mount locking plate of claim 1 including a second mount locking plate, said second mount locking plate secured to a second end of the elastomer mount secured to the third member.

7. The mount locking plates of claim 6 including a cabinet secured to said second mount locking plate.

8. The mount locking plates of claim 7 including a third mount locking plate secured to an opposite side of said cabinet and a fourth mount locking plate secured to a second support surface with an elastomer mount cantileverly engaging said third mount locking plate and said fourth mount locking plate.

9. The mount locking plate of claim 8 including at least two elastomer mounts on each side of said cabinet with said cabinet cantileverly supported by said elastomer mounts.

\* \* \* \* \*